US009726376B2

(12) United States Patent
Watanabe et al.

(10) Patent No.: US 9,726,376 B2
(45) Date of Patent: ***Aug. 8, 2017

(54) GLOW PLUG WITH COMBUSTION PRESSURE SENSOR

(75) Inventors: Tadashi Watanabe, Komaki (JP);
Yoshihiro Nakamura, Komaki (JP);
Shunsuke Maeda, Toyota (JP);
Masayoshi Matsui, Ichinomiya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 512 days.

This patent is subject to a terminal disclaimer.

(21) Appl. No.: 13/976,783

(22) PCT Filed: Feb. 21, 2012

(86) PCT No.: PCT/JP2012/054059
§ 371 (c)(1),
(2), (4) Date: Jun. 27, 2013

(87) PCT Pub. No.: WO2012/115082
PCT Pub. Date: Aug. 30, 2012

(65) Prior Publication Data
US 2013/0269641 A1    Oct. 17, 2013

(30) Foreign Application Priority Data

Feb. 25, 2011    (JP) ................ 2011-039119

(51) Int. Cl.
*F23Q 7/00* (2006.01)
*F02P 19/02* (2006.01)
(Continued)

(52) U.S. Cl.
CPC ............ *F23Q 7/001* (2013.01); *F02P 19/028* (2013.01); *G01L 23/22* (2013.01); *F02D 35/023* (2013.01); *F23Q 2007/005* (2013.01)

(58) Field of Classification Search
CPC ........ F23Q 7/001; F23Q 2007/002–2007/005; F02P 19/208; G01L 23/22; F02D 35/023
(Continued)

(56) References Cited

U.S. PATENT DOCUMENTS

| 7,228,730 B2 | 6/2007 | Haussner et al. |
| 7,431,003 B2 | 10/2008 | Ludwig et al. |

(Continued)

FOREIGN PATENT DOCUMENTS

| JP | 2006-10306 A | 1/2006 |
| JP | 2006-84468 A | 3/2006 |

(Continued)

OTHER PUBLICATIONS

Office Action ("Notification of Reason for Rejection") mailed Jul. 16, 2013 for corresponding Japanese Patent Application No. 2012-530033.

(Continued)

*Primary Examiner* — Grant Moubry
*Assistant Examiner* — Michael A Kessler
(74) *Attorney, Agent, or Firm* — Sughrue Mion, PLLC (57) ABSTRACT

A glow plug wherein a combustion gas prevention wall (67) extends radially outward on the outer circumferential surface of heater (10) such that when the heater (10) is viewed rearward from its forward end (10a) along the axial direction, the combustion gas prevention wall (67) closes an annular gap K1 at a position forward of annular membrane portion (63) of seal member (60). The combustion gas prevention wall (67) has an outer diameter D2 greater than the inner diameter D1 of forward end (136) of the housing.

5 Claims, 10 Drawing Sheets

(51) Int. Cl.
 *G01L 23/22* (2006.01)
 *F02D 35/02* (2006.01)

(58) Field of Classification Search
 USPC .......... 73/114.16–114.19; 123/145 A, 145 R, 123/179.5, 179.6, 179.21; 361/264; 219/267, 270, 534, 544, 553
 See application file for complete search history.

(56) References Cited

U.S. PATENT DOCUMENTS

| | | | |
|---|---|---|---|
| 7,581,520 B2 | 9/2009 | Kern et al. | |
| 7,624,620 B2 * | 12/2009 | Hirose | G01L 23/00 73/35.12 |
| 7,905,209 B2 * | 3/2011 | Goto | F23Q 7/001 123/143 R |
| 8,939,121 B2 * | 1/2015 | Nishiyuki et al. | 123/145 A |
| 2004/0182144 A1 * | 9/2004 | Okazaki et al. | 73/118.1 |
| 2005/0061063 A1 * | 3/2005 | Haussner | F23Q 7/001 73/114.18 |
| 2006/0053875 A1 | 3/2006 | Haussner et al. | |
| 2007/0209624 A1 | 9/2007 | Ludwig et al. | |
| 2007/0245806 A1 | 10/2007 | Hirose et al. | |
| 2007/0289370 A1 | 12/2007 | Hirose et al. | |
| 2008/0223139 A1 | 9/2008 | Hirose et al. | |
| 2008/0302323 A1 | 12/2008 | Kern et al. | |

FOREIGN PATENT DOCUMENTS

| | | |
|---|---|---|
| JP | 2007-507681 A | 3/2007 |
| JP | 2007309916 A | 11/2007 |
| JP | 2008-2809 A | 1/2008 |
| JP | 2008139150 A | 6/2008 |
| JP | 2008-525758 A | 7/2008 |
| JP | 2009-520941 A | 5/2009 |
| JP | 2010-139148 A | 6/2010 |
| WO | 2007/073959 A1 | 7/2007 |

OTHER PUBLICATIONS

Communication dated Dec. 15, 2014 from the Korean Intellectual Property Office in corresponding Korean Patent Application 10-2013-7024475.

* cited by examiner

GLOW PLUG WITH COMBUSTION PRESSURE SENSOR

CROSS REFERENCE TO RELATED APPLICATIONS

This application is a National Stage of International Application No. PCT/JP2012/054059 filed Feb. 21, 2012, claiming priority based on Japanese Patent Application No. 2011-039119 filed Feb. 25, 2011, the contents of all of which are incorporated herein by reference in their entirety.

TECHNICAL FIELD

The present invention relates to a glow plug having a combustion pressure sensor (a glow plug with a combustion pressure sensor), adapted to promote ignition within a combustion chamber of an engine and to sense (detect) combustion pressure as well. Specifically, the present invention relates to a glow plug having a combustion pressure sensor which is mounted to an engine head such that its heater is exposed to the interior of a combustion chamber for the purpose of promoting ignition of fuel and receiving, through the heater, combustion pressure (combustion gas pressure) in the combustion chamber so as to sense the combustion pressure by means of a sensor, such as a piezoelectric element or a strain sensor (gauge), disposed within a housing which holds the heater.

BACKGROUND ART

Figure 9:
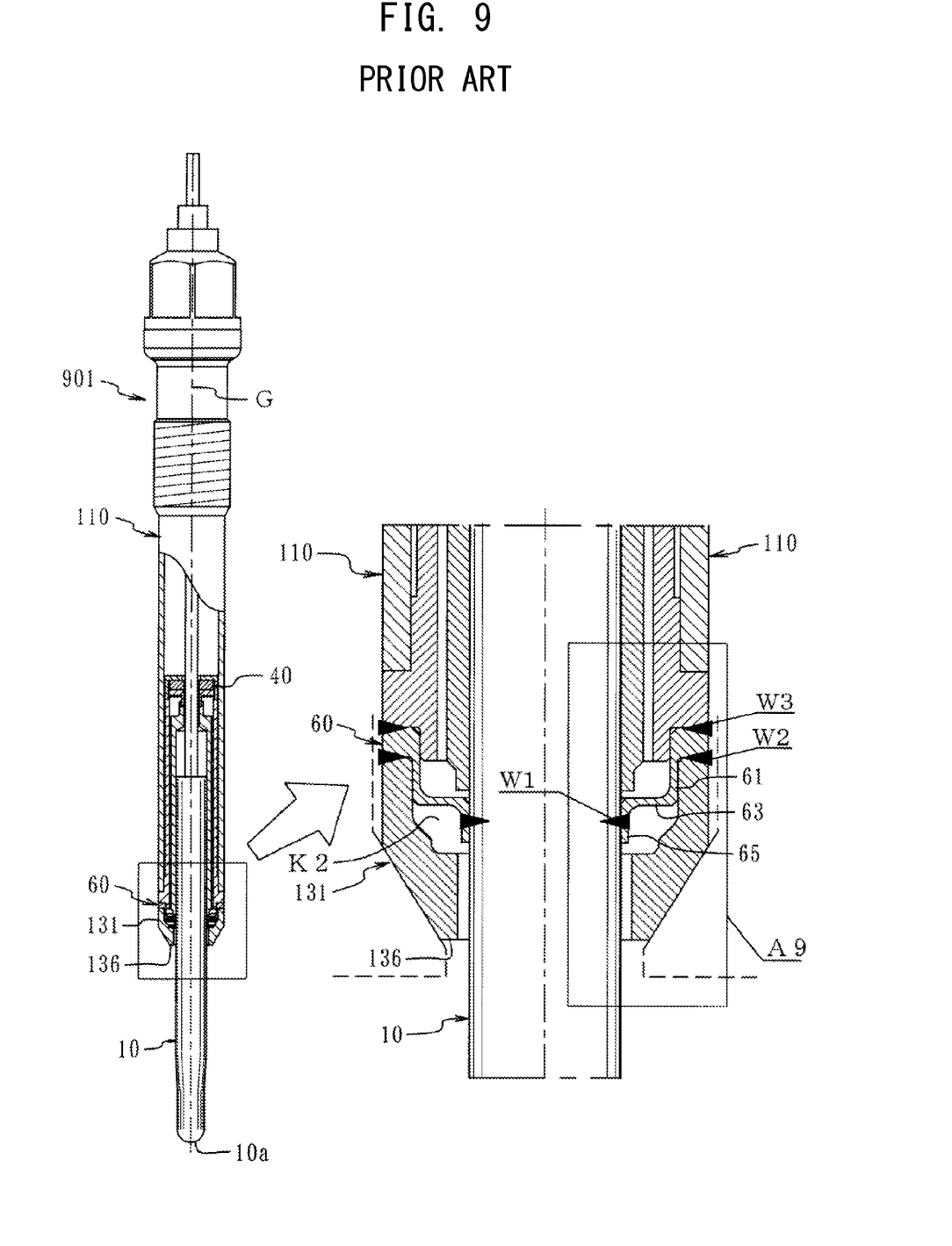
FIG. 9 Longitudinal, partially sectional view showing an example of a conventional glow plug having a combustion pressure sensor, and an enlarged view of a portion of the sectional view, showing a seal member, etc.
Figure 10:
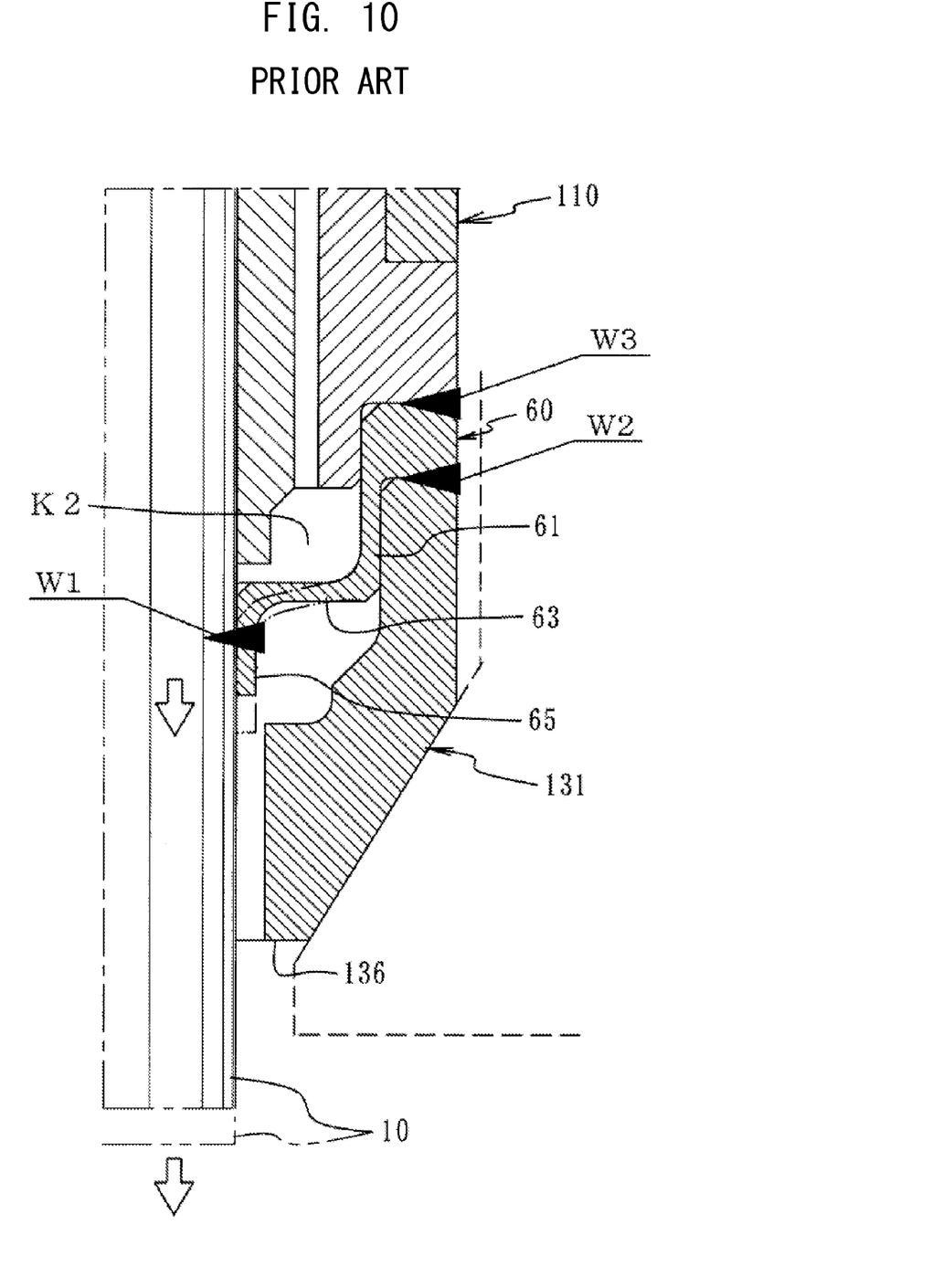
FIG. 10 Enlarged view of region A9 (portion including the seal member) of FIG. 9 for explaining a problem involved in the glow plug of FIG. 9.

There are known various types of such a glow plug having a combustion pressure sensor (hereinafter, may be referred to merely as a glow plug) (refer to, for example, Patent Document 1). FIG. 9 is a longitudinal, partially sectional view showing a simplified sectional structure of a glow plug 901 of the same type. The glow plug 901 of FIG. 9 is configured such that a rodlike (circular columnar) heater (e.g., a metal heater or a ceramic heater) 10 which generates heat through energization is disposed within a tubular housing 110 with its forward end (an end on a side toward a combustion chamber, or a lower end in FIG. 9) 10a projecting from a forward end 136 of the housing 110. Notably, the dashed lines in FIGS. 9 and 10 show the vicinity of a combustion chamber of an engine head. In the glow plug 901, in consideration of reception of combustion pressure, thermal expansion of the heater 10, etc., the heater 10 is disposed within the housing 110 in such a manner as to be displaceable in the direction of its axis G (axial direction), by a very small amount. That is, the heater 10 is disposed with a gap (annular gap) formed in cooperation with the inner circumferential surface of the housing 110. A sensing means; for example, a piezoelectric element 40, for detecting pressure generated as a result of combustion pressure pressing the heater 10 rearward from the forward end 10a is disposed rearward of the heater 10. This configuration is designed as follows: a force generated as a result of combustion pressure pressing the heater 10 rearward compresses the piezoelectric element 40, and an electric signal generated according to a change in compressive force applied to the piezoelectric element 40 is measured, whereby the combustion pressure is detected. Notably, in Patent Document 1, a strain gage is used as sensing means.

Incidentally, in the glow plug 901, there must be prevented entry of high-temperature, high-pressure combustion gas from the forward end 136 of the housing 110 into a rear interior region of the housing 110 through the above-mentioned annular gap between the inner circumferential surface of the housing 110 and the outer circumferential surface of the heater 10 (i.e., a seal must be established). In order to meet this requirement, usually a certain seal member is disposed in the annular gap between the inner circumferential surface of the housing 110 and the outer circumferential surface of the heater 10. For example, in the glow plug 901 of FIG. 9, as shown in the enlarged view in FIG. 9 and in FIG. 10, a diameter increased annular space K2 having a larger diameter is formed within a forward-end portion (forward-end housing 131) of the housing 110, and a seal member 60 for preventing entry of combustion gas into the rear interior region is disposed in the space K2. Meanwhile, in order to allow displacement in the direction of the axis G of the heater 10 in relation to the housing 110, a heat-resistant member having a sufficiently flexible annular film portion (membrane) 63 such as a metal membrane which is not bellows but is a diaphragm or the like which is readily deformable in the axial direction (e.g., a membrane of SUS630) is used for the seal member 60. The seal member 60 shown in FIGS. 9 and 10 has a small-diameter tubular portion 65 located on the forward side, a large-diameter tubular portion 61 located on the rear side, and the annular membrane portion 63 disposed between the small-diameter tubular portion 65 and the large-diameter tubular portion 61 in such a manner as to partition the diameter increased annular space K2 into axially forward and rearward parts. In the above-mentioned diameter increased annular space K2, the small-diameter tubular portion 65 of the seal member 60 is welded to the heater 10 at a predetermined position (solid triangular portion) W1 along the outer circumferential surface of the heater 10 by, for example, laser welding, and the large-diameter tubular portion 61 of the seal member 60 is fixed to the housing 110 at predetermined rearward positions (solid triangular portions) W2 and W3 along the circumferential direction by, for example, welding. This ensures a seal between the inner circumferential surface of the forward end 136 of the housing 110 and the outer circumferential surface of the heater 10.

Namely, in the case where the displacement of the heater 10 in the direction of the axis G (axial direction) in relation to the housing 110 is permitted by the seal member 60, the seal member 60 is configured such that mainly the annular membrane portion 63 deforms so as to allow the displacement of the heater 10 in the direction of the axis G while maintaining the seal. As described above, the seal member 60 plays a role of shutting off a high-temperature, high-pressure combustion gas which enters a space (annular gap) between the outer circumferential surface of the heater 10 and the inner circumferential surface of a portion of the housing 110 located near the forward end 136 thereof (hereinafter referred to as the "near-forward-end portion of the housing 110), and a role of allowing displacement of the heater 10 in the direction of the axis G in relation to the housing 110. Although unillustrated, according to a certain configuration, the seal member is disposed between the inner circumferential surface of the housing and the outer circumferential surface of the heater 10 at a position located deep in the housing away from the forward end of the housing, thereby establishing a seal therebetween. Such a configuration does not require provision of the aforementioned seal member 60 at the near-forward-end portion of the housing. However, depending on the position of the seal member disposed deep in the housing, there is usually required the provision, in addition to the seal member, of a holding member for holding the heater while allowing axial displacement of the heater, at the forward end of the housing or at the near-forward-end portion of the housing. That is, a configurational feature having easy deformability similar to that of the above-mentioned seal member must be provided. This is for the following reason: since the heater is in a loose fit condition in the housing, and the projecting forward end of the heater is a free end, in order to stably hold such a heater, the heater must be held (supported) at the forward end of the housing or at the near-forward-end portion of the housing, in addition to provision of the seal member disposed deep in the housing. As will be understood from this requirement, the above-mentioned seal member 60 also plays a role of holding the heater; therefore, the seal member 60 can also be said to be a holding member for holding the heater at the forward end of the housing or at the near-forward-end portion of the housing.

PRIOR ART DOCUMENT

Patent Document

Patent Document 1: Japanese Patent Application Laid-Open (kokai) No. 2010-139148

SUMMARY OF THE INVENTION

Problems to be Solved by the Invention

As is apparent from the above description, the seal member 60 is disposed between the inner circumferential surface of the housing 110 and the outer circumferential surface of the heater 10 in such a manner as to be directly hit by a high-temperature, high-pressure combustion gas (blast) which enters from the forward end 136 as a result of execution of a combustion cycle of an engine, so that the seal member 60 undergoes thermal shock. Meanwhile, in order to ensure easy deformability, the seal member 60, including the annular membrane portion 63, is greatly thin-walled as compared with other component members (portions), such as the heater 10 and a forward end portion (the forward-end housing 131) of the housing 110. For example, the annular membrane portion 63 has a thickness of only about 0.15 mm to 0.30 mm. Thus, when the seal member 60 is directly hit by a high-temperature, high-pressure combustion gas in execution of a combustion cycle, as compared with other component members, such as the heater 10 and the housing 110, the seal member 60 assumes high temperature very quickly; i.e., instantaneously; therefore, the seal member 60 instantaneously assumes a relatively large thermal expansion (hereinafter, may be referred to as anomalous thermal expansion). This anomalous thermal expansion is repeated in execution of combustion cycles.

Meanwhile, the heater 10 has the projecting forward end 10a which is a free end, and the seal member 60 having the above-mention configuration has the small-diameter tubular portion 65 which is located on the forward side and is fixed, by welding, to the outer circumferential surface of the heater 10 at the predetermined position W1, and the large-diameter tubular portion 61 which is similarly fixed to the housing 110 at the predetermined positions (solid triangular portions) W2 and W3. Thus, as represented by the dash-dot-dot line in FIG. 10, as a result of direct hit by combustion gas, the seal member 60 instantaneously undergoes a relatively large thermal expansion directed forward with respect to the direction of the axis G (in the direction of the outlined arrow in FIG. 10). As a result, the heater 10 welded to the small-diameter portion 65 of the seal member 60 is subjected to an action of stress of pressing the heater forward (toward the free end) according to the anomalous thermal expansion of the seal member 60. That is, as a result of the anomalous thermal expansion of the seal member 60, the heater 10 is subjected to an action of forward tension at the heater-side welding position W1 where the heater is welded to the small-diameter portion 65; consequently, for example, a reference position in contact with the piezoelectric element 40 may be displaced (move) forward by a very small amount, or compressive force imposed on the piezoelectric element may vary.

Thus, in the glow plug 901 configured such that force generated by combustion pressure pressing the heater 10 rearward compresses the piezoelectric element 40, and an electric signal generated according to a change in the compressive force is measured or sensed, an action of anomalous thermal expansion of the seal member 60 of pressing the heater 10 forward has an effect on the compression. In this manner, in the glow plug 901 having the above-mentioned configuration, drift arises in detection of combustion pressure, thereby raising a problem of deterioration in sensing accuracy. This problem similarly exists in the case where a combustion pressure sensor is not the piezoelectric element 40, but a strain sensor (strain gage) for sensing rearward strain of the heater 10.

Also, as mentioned above, in the case where, while employing a structure in which the seal member is disposed at a position located deep in the housing away from the forward end of the housing, the holding member for holding the heater is provided at the forward end of the housing or at the near-forward-end portion of the housing, in addition to the seal member, the holding member must also allow axial displacement of the heater as does the seal member 60. Such a holding member is not required to provide a seal as mentioned above, but must be formed from a sufficiently flexible material, such as metal membrane, as in the case of the above-mentioned seal member 60. Thus, the provision of such a holding member also involves a problem similar to the above-mentioned problem involved in the case of use of the seal member. Notably, as mentioned above, since the "seal member" also plays the role of a holding member for holding the heater, the seal member hereinafter may also be referred to as the holding member.

The present invention has been conceived to solve such a problem, and an object of the invention is to provide a glow plug having a combustion pressure sensor which mitigates or reduces instantaneous, anomalous thermal expansion of the above-mentioned seal member (holding member) or the above-mentioned heater holding member provided in addition to the seal member, to thereby enhance the accuracy in sensing combustion pressure, as compared with the above-described conventional glow plug.

Means for Solving the Problems

The invention recited in claim 1 is a glow plug having a combustion pressure sensor in which a rodlike heater is disposed in a tubular housing in an axially displaceable manner with its forward end projecting from a forward end of the housing and with a gap retained between an inner circumferential surface of the housing and an outer circumferential surface of the heater and which has a sensor capable of sensing combustion pressure through detection of pressure or displacement generated as a result of the combustion pressure pressing the heater rearward from the forward end of the heater, wherein a holding member formed in a deformable manner, having an annular membrane portion and externally fitted to the heater so as to hold the heater is joined to the housing and to the heater along a circumferential direction such that at least the annular membrane portion is located in a space between an inner circumferential surface of a near-forward-end portion of the housing and the outer circumferential surface of the heater so as to partition the space between the inner circumferential surface of the housing and the outer circumferential surface of the heater into axially forward and rearward parts. The glow plug is characterized in that when viewed rearward from the forward end along the axial direction, a combustion gas prevention wall which extends radially outward is provided forward of the annular membrane portion of the holding member.

The invention recited in claim 2 is a glow plug having a combustion pressure sensor according to claim 1, wherein the combustion gas prevention wall is provided between the inner circumferential surface of the housing and the outer circumferential surface of the heater. The invention recited in claim 3 is a glow plug having a combustion pressure sensor according to claim 1 or 2, wherein the combustion gas prevention wall is provided on a tubular portion or annular portion which extends forward from an inner peripheral edge of the annular membrane portion of the holding member.

The invention recited in claim 4 is a glow plug having a combustion pressure sensor according to any one of claims 1 to 3, wherein the near-forward-end portion of the housing has a diameter increased annular inner circumferential surface having a diameter greater than the inner diameter of the forward end of the housing, the holding member is disposed such that at least its annular membrane portion is located in a space between the diameter increased annular inner circumferential surface and the outer circumferential surface of the heater, and the combustion gas prevention wall has an outer diameter greater than the inner diameter of the forward end of the housing. The invention recited in claim 5 is a glow plug having a combustion pressure sensor according to any one of claims 1, 2, and 4, wherein the combustion gas prevention wall is provided forward of the holding member separately from the holding member.

When the glow plug of the present invention is attached to an engine (engine head), the annular membrane portion is exposed to a combustion chamber of the engine. In the present invention, since the combustion gas prevention wall is provided, combustion gas of high temperature and high pressure—which rushes from the forward end of the heater toward the rear end thereof along the outer circumferential surface thereof during combustion cycles of the engine—directly hits against the combustion gas prevention wall. Namely, in the present invention, since the combustion gas prevention wall is preset, such combustion gas first hits against the combustion gas prevention wall, detours it, and then reaches the annular membrane portion. Namely, the fraction of the combustion gas which directly hits against the annular membrane portion is reduced. Therefore, as compared with a conventional glow plug in which the combustion gas prevention wall is not provided, the time required for combustion gas to reach the annular membrane portion can be increased, and it is expected that combustion gas cools before reaching the annular membrane portion. As described above, in the glow plug of the present invention, combustion gas does not directly hit against the annular membrane portion, and the time required for combustion gas to reach the annular membrane portion can be increased. Therefore, it is possible to prevent or restrain the annular membrane portion from instantaneously becoming an anomalously high temperature and causing anomalous thermal expansion as in the conventional glow plug. Therefore, the action of pushing the heater forward in the axial direction can be mitigated or prevented. As a result, the conventional problem that drift arises in detection of combustion pressure can be mitigated or prevented, whereby the accuracy in sensing combustion pressure can be improved.

Notably, in the invention recited in claim 1, the term "deformable" means that when combustion gas tries to enter a rear portion of the interior of the housing through the annular gap between the inner circumferential surface of the forward end of the housing and the outer circumferential surface of the heater, the holding member can slightly expand or contract with displacement of the heater relative to the housing.

In the present invention, no limitation is imposed on the position of the combustion gas prevention wall so long as it can prevent high-temperature combustion gas which rushes in the axial direction of the heater along the surface thereof from directly hitting against the annular membrane portion of the holding member. Accordingly, the combustion gas prevention wall may be provided between the inner circumferential surface of the housing and the outer circumferential surface of the heater as recited in claim 2, or may be provided on a tubular portion or annular portion which extends forward from the inner peripheral edge of the annular membrane portion of the holding member as recited in claim 3. Also, in the present invention, no limitation is imposed on the position of the annular membrane portion of the holding member so long as the holding member is joined to the housing and to the heater along the circumferential direction such that at least the annular membrane portion is located in the space between the inner circumferential surface of a near-forward-end portion of the housing and the outer circumferential surface of the heater so as to partition the space between the inner circumferential surface of the housing and the outer circumferential surface of the heater into axially forward and rearward parts. Namely, in the present invention, the inner circumferential surface of the near-forward-end portion of the housing which include the forward end of the housing and in which the annular membrane portion of the holding member is located may be straight (have a fixed diameter) up to the forward end.

However, preferably, as recited in claim 4, the near-forward-end portion of the housing has a diameter increased annular inner circumferential surface having a diameter greater than the inner diameter of the forward end of the housing, the holding member is disposed such that at least its annular membrane portion is located in the space between the diameter increased annular inner circumferential surface and the outer circumferential surface of the heater, and the combustion gas prevention wall has an outer diameter greater than the inner diameter of the forward end of the housing. Namely, in the present invention, as a result of employment of the structure recited in claim 4, the forward end of the housing has an inner diameter smaller than the diameter of the inner space of the housing. In the invention of claim 4, when the heater is viewed from its forward end, the outer peripheral edge of the combustion gas prevention wall is located radially outward of the inner circumferential surface of the forward end of the housing. Therefore, combustion gas which rushes from the forward end of the heater toward the rear end thereof (along the outer circumferential surface thereof) becomes less likely to directly hit against the annular membrane portion. Notably, "the space between the diameter increased annular inner circumferential surface and the outer circumferential surface of the heater" in the invention recited in claim 4 will also be referred to below as a "diameter increased annular space" in the present specification, because an annular space is formed between the diameter increased annular inner circumferential surface and the outer circumferential surface of the heater. Notably, it is preferred that the combustion gas prevention wall be provided in the "diameter increased annular space." As recited in claim 5, the combustion gas prevention wall may be provided forward of the holding member separately from the holding member. Namely, a member (separate member) different from the holding member may be provided on the outer circumferential surface of the heater by means of welding or the like.

In the present invention, welding, such as laser welding, is a preferred means for joining the holding member having the above-mentioned annular membrane portion to the housing and the heater along the circumferential direction. However, in addition to welding, this joining means may be brazing, crimping, press-fitting, or a combination thereof. In the present invention, the expression "joined along the circumferential direction" encompasses, in addition to the case where the holding member is joined continuously along the entire circumference, the case where the holding member is joined discontinuously along the circumferential direction and the case where the holding member is joined continuously along the circumferential direction, but not along the entire circumference. The expression "joined continuously along the entire circumference" means that the holding member is joined continuously along at least full circumference or more and, therefore, means that a seal is established between an axially forward part and an axially rearward part with respect to the joint portion. Therefore, in the case where the holding member is also the seal member, in order to ensure a seal (gastightness), the holding member is jointed to the housing and to the heater continuously along the entire circumference at the respective joint portions. The expression "joined discontinuously along the circumferential direction" means that the holding member is joined intermittently, usually at a plurality of positions, such as at three positions or at four positions, along the circumferential direction and is applied to the holding member which is not required to provide a seal. That is, in the case where the holding member is a mere holding member provided in addition to the seal member, the holding member is not required to partition the space between the inner circumferential surface of the housing and the outer circumferential surface of the heater into axially forward and rearward parts, while maintaining the seal therebetween. Thus, in this case, even though the holding member is disposed in such a manner as to partition the space between the inner circumferential surface and the outer circumferential surface into axially forward and rearward parts and is joined to the housing and to the heater along the circumferential direction, there is no need to continuously join the holding member along the entire circumference.

MODES FOR CARRYING OUT THE INVENTION

A glow plug having a combustion pressure sensor according to an embodiment (first embodiment) of the present invention will be described with reference to FIGS. 1 to 5. A glow plug 101 of the present embodiment is composed primarily of a substantially cylindrical housing 110; a sheath heater 10 disposed in the housing 110 with its forward end (lower end in the drawings) 10a projecting from a forward end 136 of the housing 110; and a piezoelectric element 40 disposed at the rear end of the sheath heater 10. First, the overall configuration of the glow plug 101 will be described in detail with additional reference to the exploded views of FIGS. 4 and 5 for explaining an assembly process.

Figure 3:
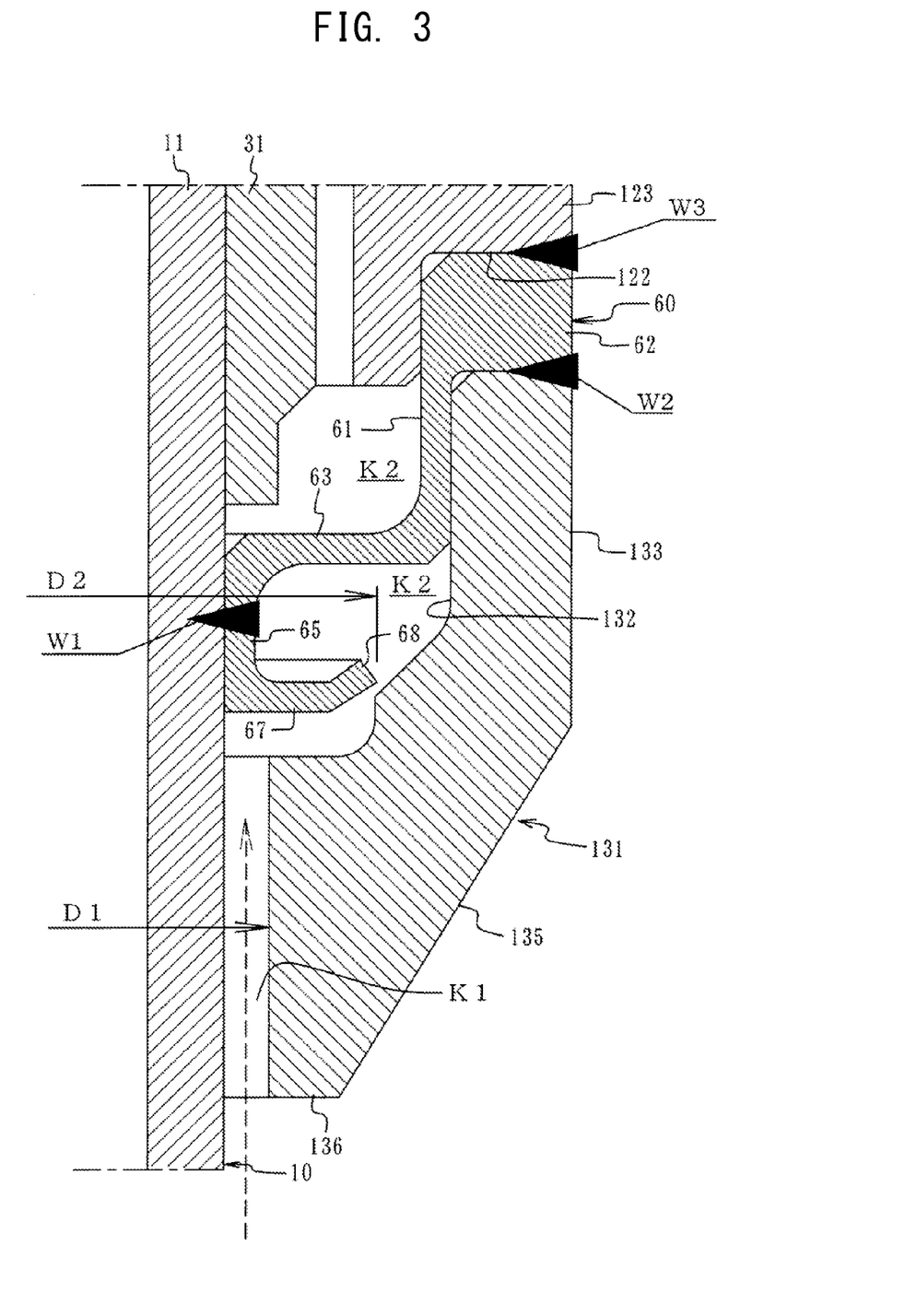
FIG. 3 Further enlarged view of region A2 of FIG. 2.

In the present embodiment, the housing 110 includes a substantially cylindrical housing body 111; a piezoelectric element-supporting inner housing 121 inserted and disposed in the housing body 111 in such a manner as to support the piezoelectric element 40 at the rear end of the sheath heater 10; and a forward-end housing 131 located at a forward end portion of the housing body 111 (see FIG. 3). The housing body 111 includes a screwing polygonal portion 113 provided on the outer circumferential surface of its rear end portion; a screw 115 adapted to be screwed into a cylinder head and provided on an outer circumferential surface located forward of the screwing polygonal portion 113; and a cylindrical portion 117 located forward of the screw 115 and having a diameter slightly smaller than the minor diameter of the screw 115. The piezoelectric element-supporting inner housing 121 is inserted and disposed along the inner circumferential surface of a near-forward-end portion of the cylindrical portion 117.

The element-supporting inner housing 121 is a cylindrical tube having an outer diameter slightly smaller than the inner diameter of the housing body 111 (see FIG. 4) and includes a flange 123 projecting on the outer circumferential surface of its forward end portion. The flange 123 has the same outer diameter as that of the cylindrical portion 117 of the housing body 111, and, as shown in the enlarged view in FIG. 1 and FIG. 2, the flange 123 is fixed to the housing body 111 by, for example, welding such that a rear end surface 124 of the flange 123 is in contact with a forward end 118 of the housing body 111. Meanwhile, as shown in the enlarged view in FIG. 1, a cylindrical cap 127 having an annular bottom plate 126 with a center opening is welded to a rear end 125 of the element-supporting inner housing 121 via the forward end of a cylindrical portion 128 of the cap 127. The annular piezoelectric element 40 sandwiched between insulation plates 47 via respective electrode plates 43 and 44 is disposed, within the cylindrical cap 127, in contact with the annular bottom plate 126. Notably, leads extend rearward from the respective electrode plates 43 and 44.

Meanwhile, the sheath heater 10 includes a cylindrical sheath pipe 11 having a forward end 10a in the form of a hemispheric convex and extending rearward; a heat-generating coil 21 disposed in the sheath pipe 11 in such a manner as to extend rearward and connected to an inner forward end of the sheath pipe 11; and an electricity conduction rod (circular rod) 25 connected, within the sheath pipe 11, to the rear end of the heat-generating coil 21 and extending rearward. In the present example, the electricity conduction rod 25 projects from the rear end of the sheath pipe 11, and a sheath pipe sleeve 31 is externally fitted to a near-rear-end portion of the sheath pipe 11 so as to close the rear end of the sheath pipe 11 (see the center of FIG. 4). The sheath heater 10 generally has a rodlike form and is disposed such that about a forward half of the sheath pipe 11 projects from the forward end 136 of the housing 110. Also, as shown in the enlarged view in FIG. 1, the sheath pipe sleeve 31 has a circular rear-end bottom portion 33 having a reduced inner diameter so as to allow the electricity conduction rod 25 to project therethrough and also has a cylindrical portion 35 projecting rearward from the rear end surface of the rear-end bottom portion 33. In the present embodiment, the sheath pipe sleeve 31 is held such that its forward end is located at substantially the same position as that of the forward end of the element-supporting inner housing 121 or slightly forward of the forward end of the element-supporting inner housing 121, and the sheath pipe sleeve 31 has a forward end portion in the form of a thin-walled portion 37 whose outer diameter is reduced. The sheath pipe sleeve 31 is welded to the outer circumferential surface of the sheath pipe 11 along the circumferential direction. The sheath pipe sleeve 31 is disposed within the element-supporting inner housing 121 with a gap formed between the sheath pipe sleeve 31 and the inner circumferential surface of the element-supporting inner housing 121.

Meanwhile, the electricity conduction rod 25 extends rearward in the housing 110 along an axis G of the housing 110 in such a manner as to extend through the cylindrical portion 35 at the rear end of the sheath pipe sleeve 31 and through (through holes of) a pressing member 50, which will be described below, disposed rearward of the cylindrical portion 35, the above-mentioned piezoelectric element 40, and the annular bottom plate 126 of the cylindrical cap 127. A rear end portion of the electricity conduction rod 25 is fixed at a rear end portion of the housing body 111 while being electrically insulated by an unillustrated insulation material or the like, and projects outward. Although unillustrated, an insulation powder is charged into the interior of the sheath pipe 11, and its rear end is sealed with rubber or the like.

The pressing member 50 is disposed between the cylindrical portion 35 at a rear end portion of the sheath pipe sleeve 31 fitted onto the sheath heater 10 and the above-mentioned piezoelectric element 40 via the electrode plate 43 and the insulation plate 47 disposed at the forward end of the piezoelectric element 40, and the pressing member 50 has an annular plate portion 51 having substantially the same diameter as that of the insulation plate 47, and a small annular portion 53 concentrically extending forward from the annular plate portion 51. The small annular portion 53 of the pressing member 50 is coaxially fixed to the cylindrical portion 35 at the rear end portion of the sheath pipe sleeve 31. Incidentally, the sheath heater 10 is disposed in the element-supporting inner housing 121 such that a gap is maintained between the sheath heater 10 and the inner circumferential surface of the element-supporting inner housing 121, as mentioned above, and the forward end 10a of the sheath heater 10 projects from the forward end 136 of the tubular housing 110. Thus, the heater 10 is compressed along the direction of the axis G (rearward) by pressure generated as a result of combustion pressure pressing the heater 10 rearward from the forward end 10a, and the piezoelectric element 40 is compressed between the annular plate portion 51 of the pressing member 50 fixed to the cylindrical portion 35 at the rear end portion of the sheath pipe sleeve 31 and the annular bottom plate 126 of the annular cap 127 fixed to the rear end of the element-supporting inner housing 121. A voltage signal generated by this compression can be output from the electrode plates 43 and 44 via leads extending rearward. The leads from the electrode plates 43 and 44 extend outward through, for example, a space between the electricity conduction rod 25 and the inner wall of the annular bottom plate 126 of the cylindrical cap 127 while being electrically insulated.

In the glow plug 101 of the present embodiment, as mentioned above, the element-supporting inner housing 121 is fixed, by welding, to the housing body 111 such that the rear end surface 124 of the flange 123 projecting from the outer circumferential surface of a forward end portion of the element-supporting inner housing 121 is in contact with the forward end 118 of the housing body 111. Meanwhile, in the present embodiment, the forward-end housing 131 is fixed to a forward end surface (annular surface) 122 of the flange 123 of the element-supporting inner housing 121 via the holding member (seal member, in the present embodiment) 60, which forms the main portion of the present invention to be described next. In the present embodiment and the embodiments appearing below, since the "holding member" is a seal member, the "holding member" is referred to as the "seal member." Namely, the forward-end housing 131, which has a cylindrical portion 133 having the same outer diameter as the flange 123 and a tapered cylindrical portion 135 which is located forward of the cylindrical portion 133 and has a tapered outer circumferential surface is fixed through the seal portion 60 to the forward end surface (annular surface) 122 of the flange 123 of the element-supporting inner housing 121 by means of welding (W2, W3). Although the seal member 60 will be described in detail next, the inner diameter D1 of the forward end 136 of the tapered cylindrical portion 135 of the forward-end housing 131 is set such that a small annular gap K1 is formed around the outer circumferential surface of the heater 10. Meanwhile, of the inner circumferential surface of the forward-end housing 131, a portion which is located rearward of a position near the rear end of the tapered cylindrical portion 135 in the present embodiment forms an annular inner circumferential surface (diameter increased annular inner circumferential surface 132) which has a diameter greater than the inner diameter D1 of the forward end 136, which forms the small annular gap K1. Thus, a diameter increased annular space K2 is formed between the diameter increased annular inner circumferential surface 132 and the outer circumferential surface of the heater 10 (see FIGS. 2 and 3). Hereinafter, the space between the diameter increased annular inner circumferential surface 132 and the outer circumferential surface of the heater 10 will be referred to as a "diameter increased annular space K2."

In the present embodiment, a rear end portion of the seal member 60 forms a large-diameter cylindrical portion 61 having such a relatively large diameter as to be accommodated within the diameter increased annular space K2, and a forward end portion of the seal member 60 forms a small-diameter cylindrical portion (annular portion) 65 having a smaller diameter. The two cylindrical portions 61 and 65 are connected by an annular membrane portion 63 which extends perpendicularly to the axis G and which is formed of a metal thin film which is readily deformable in the axial direction like a diaphragm. The seal member 60 has an annular fixation flange 62 which projects outward from the large-diameter cylindrical portion 61 and has the same outer diameter as the cylindrical portion 133 of the forward-end housing 131. Meanwhile, the small-diameter cylindrical portion 65 has a dimension which allows fitting of the small-diameter cylindrical portion 65 onto the outer circumference surface of the heater 10. The small-diameter cylindrical portion 65 has a combustion gas prevention wall 67 at its forward end. The combustion gas prevention wall 67 extends outward in the radial direction on the outer circumferential surface of the heater 10, and has an outer diameter D2 greater than the inner diameter D1 of the forward end 136 of the forward-end housing 131. In the present embodiment, the combustion gas prevention wall 67 has a flange shape and its distal end (its end on the outer circumferential side) is slightly curled toward the rear side.

In a state in which the outward extending fixation flange 62 of the large-diameter cylindrical portion 61 of the seal member 60 is held between the forward end surface 122 of the flange 123 of the element-supporting inner housing 121 and the cylindrical portion 133 of the forward-end housing 131, the flange 123 and the fixation flange 62 are welded together along the circumferential direction at the predetermined position W3, and the fixation flange 62 and the cylindrical portion 133 are welded together along the circumferential direction at the predetermined position W2. The small-diameter cylindrical portion 65 is welded to the outer circumferential surface of the heater 10 along the circumferential direction at the predetermined position W1. Thus, even though combustion gas enters the diameter increased annular space K2 from the forward end 136 of the forward-end housing 131 through the annular gap K1 between the inner circumferential surface of the forward end 136 and the outer circumferential surface of the heater 10 as indicated by dashed line arrows in FIGS. 2 and 3, the seal member 60 suppresses further rearward entry of the combustion gas.

Meanwhile, when the glow plug 101 of the present embodiment is mounted to the cylinder head of an engine and brought into use, combustion gas (blast) presses the heater 10 rearward from the forward end 10a thereof. Pressure generated by the press compresses the piezoelectric element 40 sandwiched between the annular bottom plate 126 of the cylindrical cap 127 fixed to the rear end of the element-supporting inner housing 121 and the annular plate portion 51 of the pressing member 50 fixed to the cylindrical portion 35 at the rear end portion of the sheath pipe sleeve 31 fitted onto the heater 10; is output in the form of a voltage signal generated by the compression; and is detected from the voltage signal. When the heater 10 is displaced rearward by a very small amount, the annular membrane portion 63 of the seal member 60 is deformed to thereby allow the displacement. In the present embodiment, the annular membrane portion 63 is formed to extend perpendicularly to the axis G. However, the shape and structure of the annular membrane portion 63 may be determined as appropriate, so long as the displacement is allowed. For example, the annular membrane portion 63 may be tapered.

In the glow plug 101 of the present embodiment, the outer diameter D2 of the combustion gas prevention wall 67 is greater than the inner diameter D1 (the diameter of the inner circumferential surface) of the forward end 136 of the housing 110. Namely, when the heater 10 is viewed rearward from the forward end 10a along the direction of the axis G, the combustion gas prevention wall 67 preferably closes the annular gap K1 between the inner circumferential surface of the forward end 136 of the housing 110 and the outer circumferential surface of the heater 10 (see FIGS. 2 and 3). Combustion gas of high temperature and high pressure—which rushes from the forward end 10a of the heater 10 toward the rear end thereof along the outer circumferential surface thereof during combustion cycles of an engine—directly hits against the combustion gas prevention wall 67 provided at the forward end of the seal member 60. Therefore, the combustion gas does not directly hit against the annular membrane portion 63. Namely, in the present embodiment, within the diameter increased annular space K2, the combustion gas first hits against the forward surface (the forward end surface) of the combustion gas prevention wall 67, detours it, and reaches the annular membrane portion 63 after having flowed along the curled portion at the outer peripheral edge of the combustion gas prevention wall 67. Therefore, as compared with the conventional glow plug in which the combustion gas prevention wall 67 is not provided (see FIGS. 9 and 10), it is possible to prevent the combustion gas of high temperature and high pressure from directly hitting against the annular membrane portion 63 or delay the time when the combustion gas hits against the annular membrane portion 63. Namely, in the present embodiment, the combustion gas prevention wall 67 mitigates or reduces anomalous thermal expansion of the annular membrane portion of the seal member in the axial direction, which anomalous thermal expansion occurs in the conventional seal member due to an instantaneous increase in temperature of the annular membrane portion thereof. In the present embodiment, the outer diameter D2 of the combustion gas prevention wall 67 is greater than the inner diameter (the diameter of the inner circumferential surface) D1 of the forward end 136 of the housing 110. Therefore, the action of preventing combustion gas from directly hitting against the annular membrane portion 63 is extremely high. However, in the present invention, the outer diameter D2 of the combustion gas prevention wall 67 may be equal to or less than the inner diameter (the diameter of the inner circumferential surface) D1 of the forward end 136 of the housing 110. This is because the combustion gas prevention wall 67 can prevent the direct hitting of combustion gas to a greater degree as compared with the case where the combustion gas prevention wall 67 is not provided.

Figure 6:
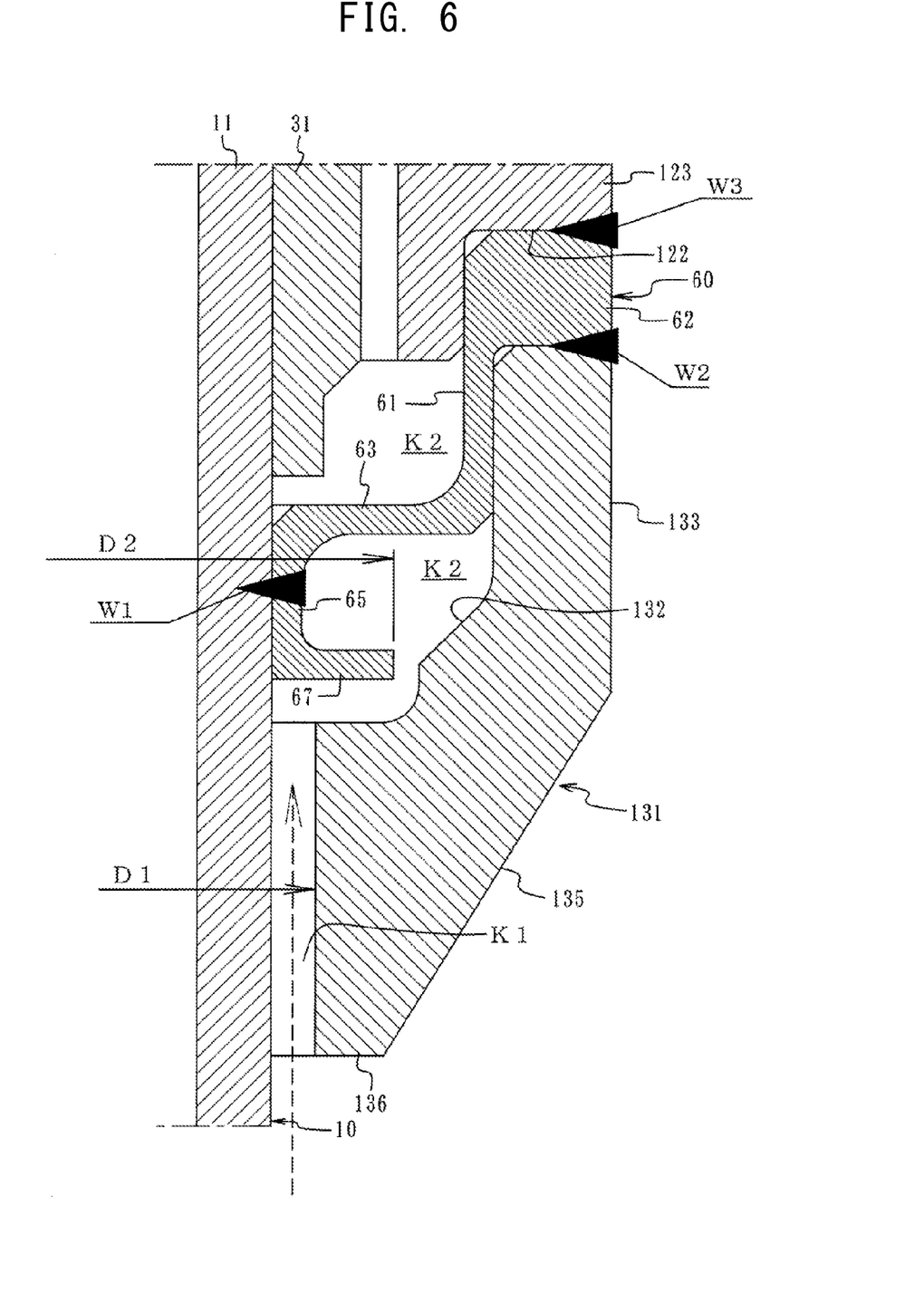
FIG. 6 View showing a modification of the combustion gas prevention wall of the seal member of FIG. 3 in which the curled portion of the combustion gas prevention wall is omitted.
Figure 7:
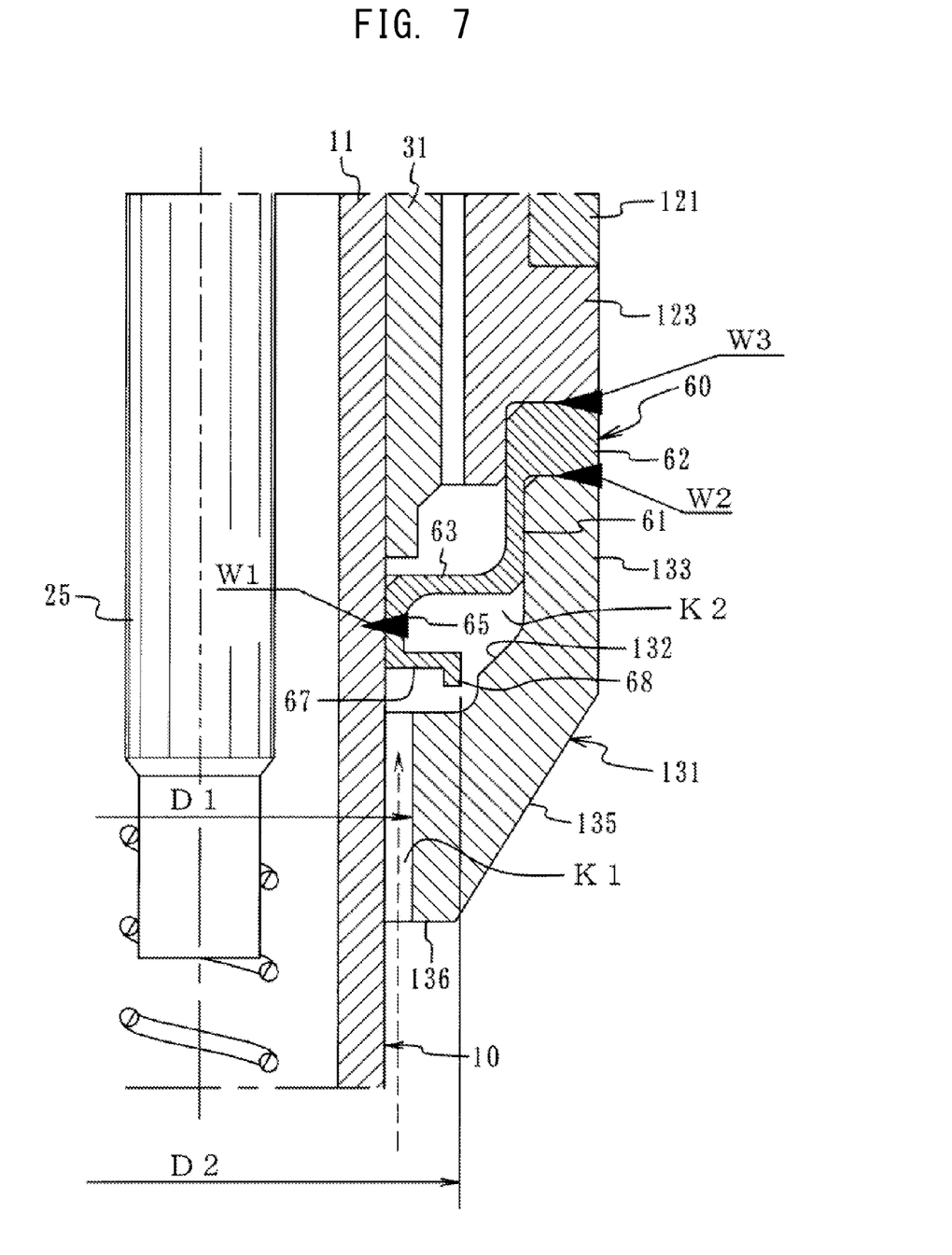
FIG. 7 Enlarged sectional view of a modification of the essential members of the glow plug of FIG. 1 including the seal member (holing member).

As a result, in the present embodiment, it is possible mitigate the phenomenon that occurs in the conventional glow plug; i.e., the phenomenon that the heater 10 is pushed forward in the axial direction by anomalous thermal expansion of the seal member in the axial direction. Thus, it becomes possible to mitigate or prevent generation of drift in detection of combustion pressure, to thereby increase the accuracy in detecting pressure. Although the present embodiment exemplifies the case where the combustion gas prevention wall 67 is slightly curled rearward at its distal end (its end on the outer circumferential side) 68, the combustion gas prevention wall 67 need not have such a curl as in the case of the seal member 60 shown in FIG. 6. The seal member 60 employed in the above-described embodiment and the seal member 60 shown in FIG. 6 differ only in the point that the curled portion is removed from the combustion gas prevention wall 67 of the seal member 60 shown in FIG. 3. Therefore, like components are denoted by like reference numerals, and their description is omitted. Also, as in the case of a modification shown in FIG. 7, the distal end portion 68 of the combustion gas prevention wall 67 may be curled (or bent) forward so as to make the flow passage of combustion gas longer or complex.

Figure 1:
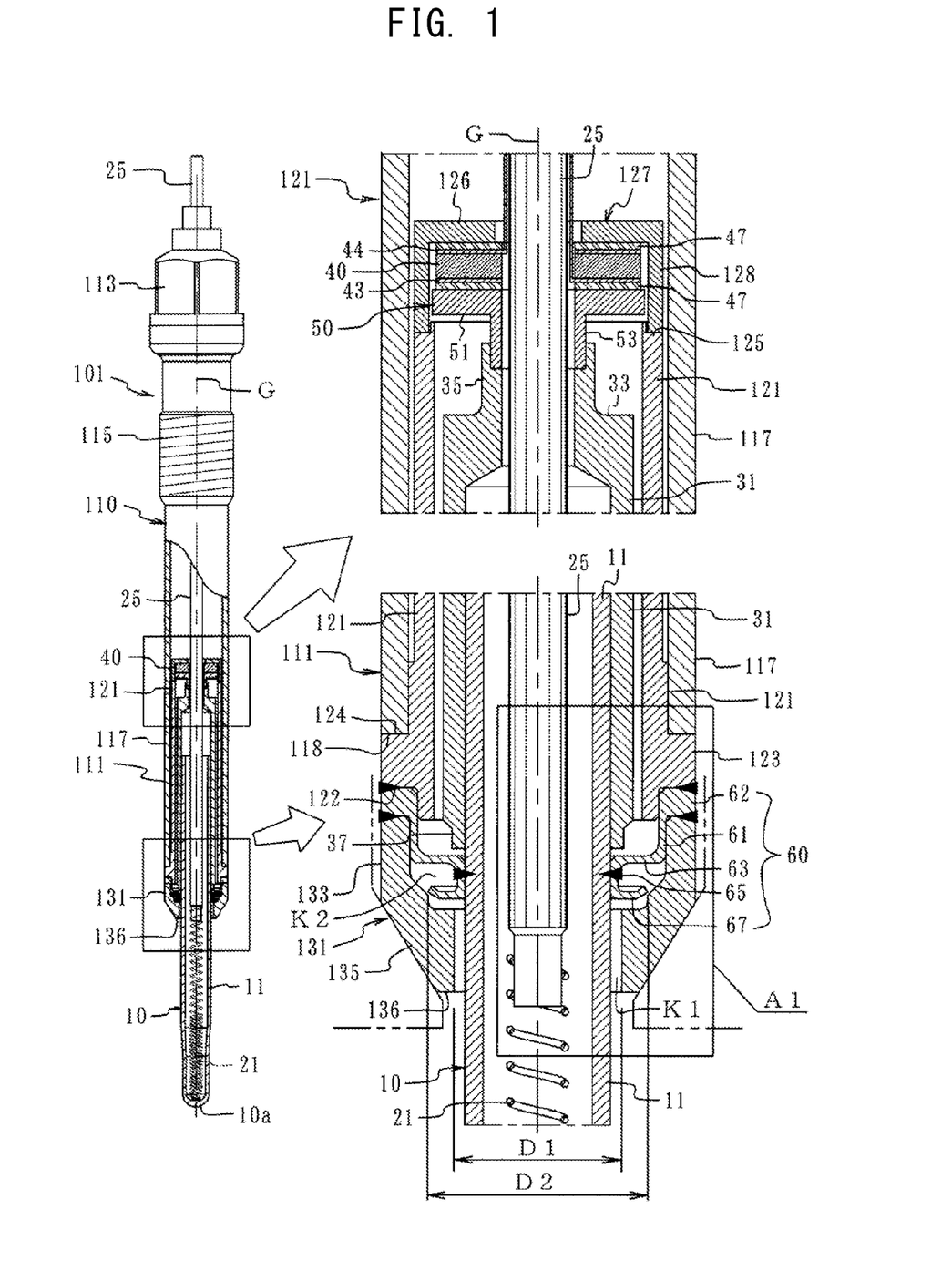
FIG. 1 Partially sectional view showing a glow plug having a combustion pressure sensor according to an embodiment (first embodiment) of the present invention, and an enlarged view of essential members of the glow plug.
Figure 2:
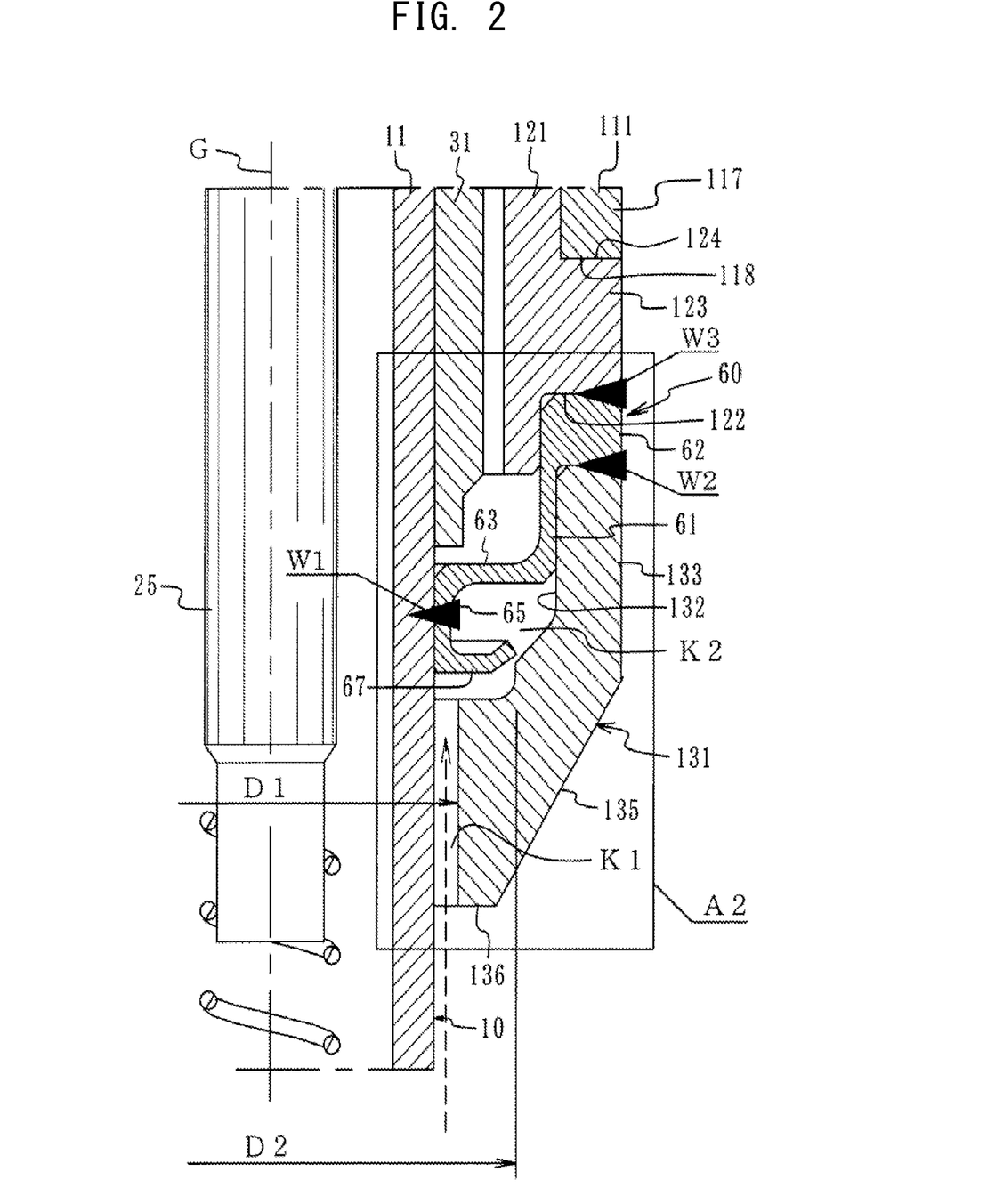
FIG. 2 Further enlarged view of region A1 (showing, on an enlarged scale, essential members including a holding member (a seal member in the present embodiment) of FIG. 1.
Figure 4:
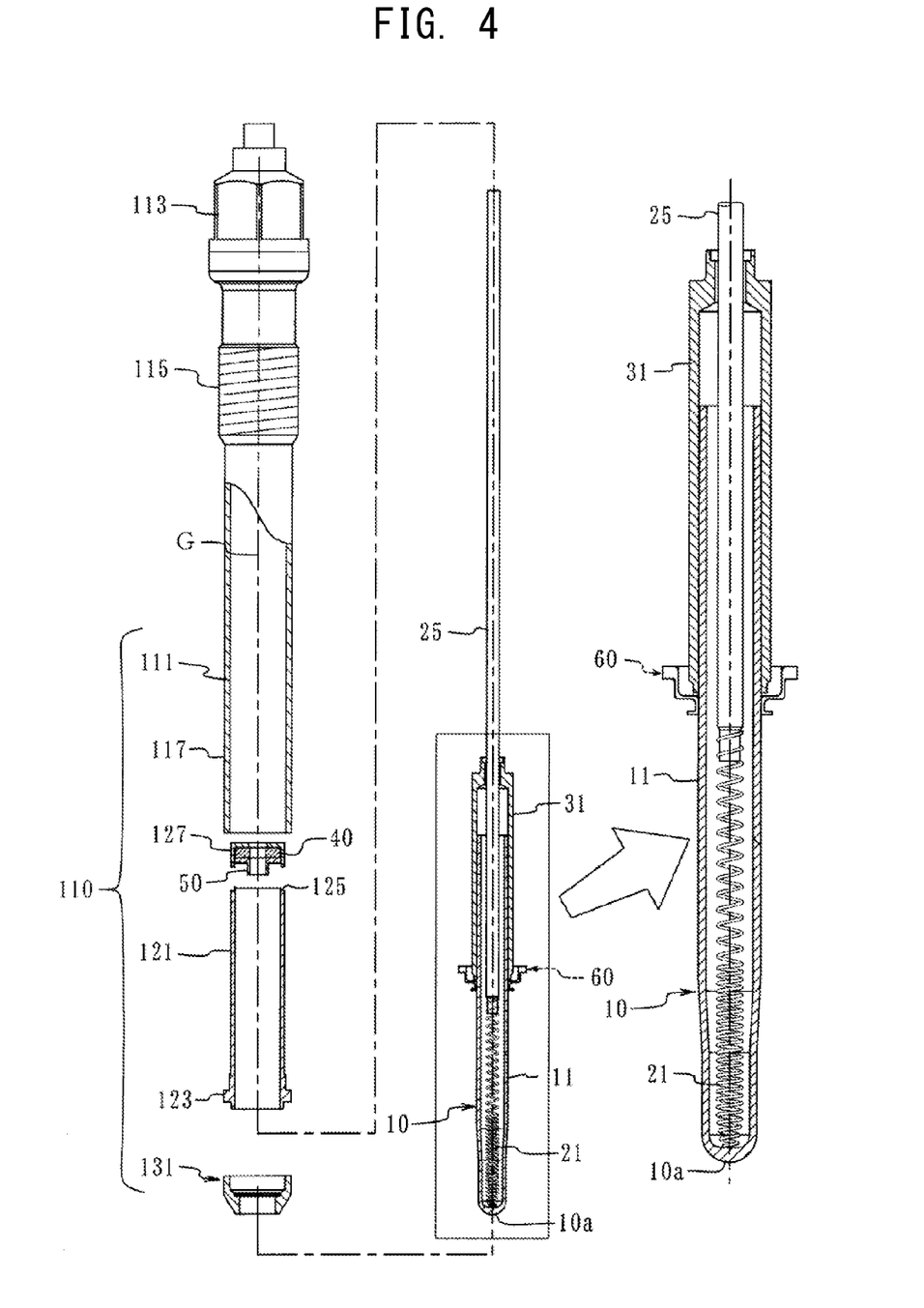
FIG. 4 Exploded view for explaining a process of assembling the glow plug of FIG. 1, showing a state before attachment of a sheath heater unit, etc., to a housing.
Figure 5:
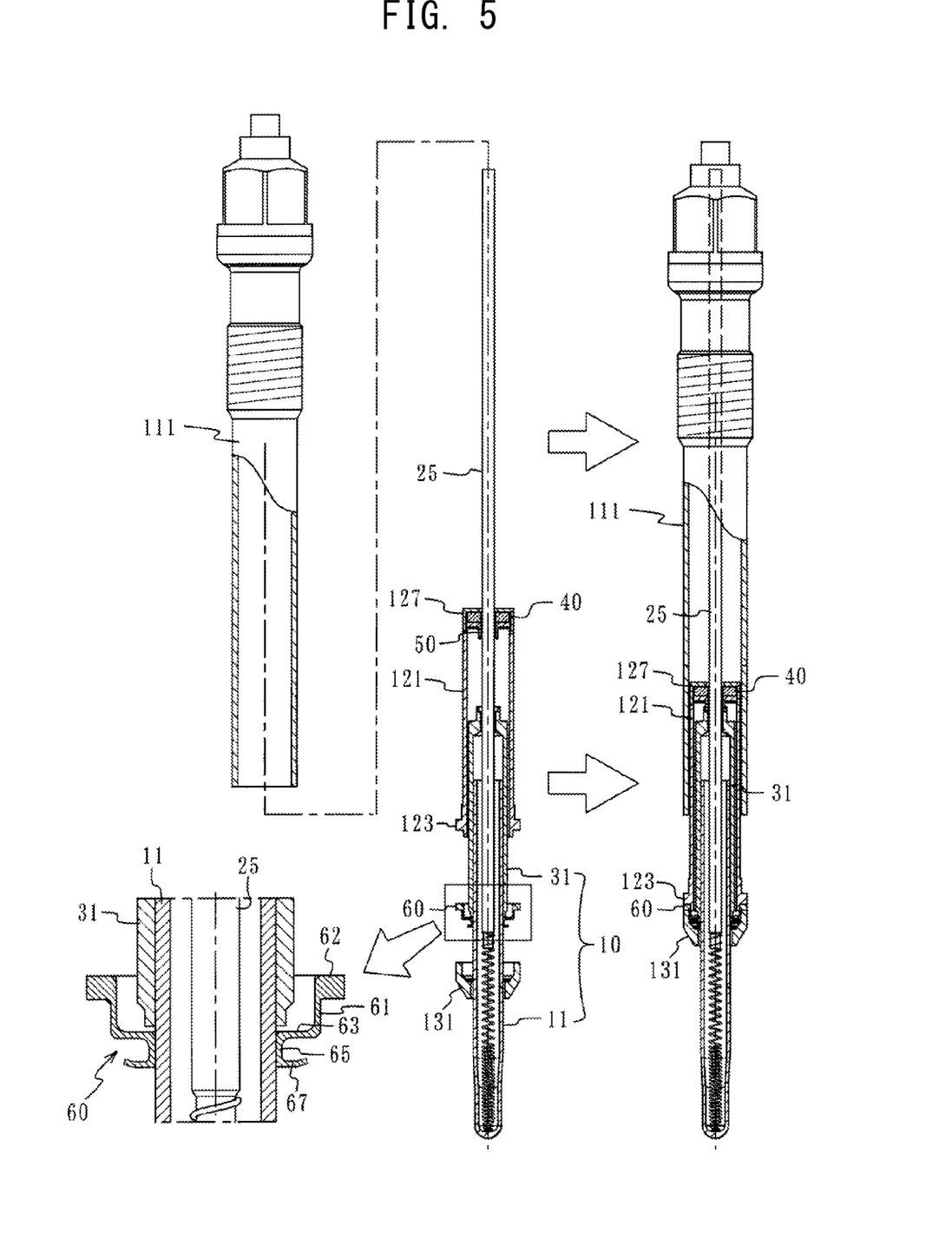
FIG. 5 Exploded view for explaining the process of assembling the glow plug of FIG. 1, showing example steps of the assembly after the state of FIG. 4.

The glow plug 101 of the present embodiment can be assembled, for example, as follows. As shown at the center of FIG. 4, the sheath heater 10 is assembled by inserting the heat-generating coil 21 and a forward end portion of the electricity conduction rod 25 into the sheath pipe 11, charging an unillustrated insulation powder into the sheath pipe 11, etc. The sheath pipe sleeve 31 is externally fitted and fixed to a near-rear-end portion of the sheath pipe 11. The seal member 60 is then fitted onto and welded to the heater 10. Subsequently, as shown at the center of FIG. 5, an assembly which has been prepared in advance by assembling the cylindrical cap 127 containing the piezoelectric element 40 to the rear end 125 of the element-supporting inner housing 121 is externally fitted onto the sheath pipe sleeve 31 such that the flange portion 123 at the forward end thereof is pressed against the seal member 60, and the forward-end housing 131 is externally fitted onto the sheath heater 10 from its forward end 10a so as to sandwich the seal member 60 in cooperation with the assembly. Welding is then performed. After that, as shown in the right-side drawing of FIG. 5, the housing body 111 is assembled, and other necessary steps such as welding are performed, whereby the glow plug 101 is assembled as shown in FIG. 1.

Figure 8:
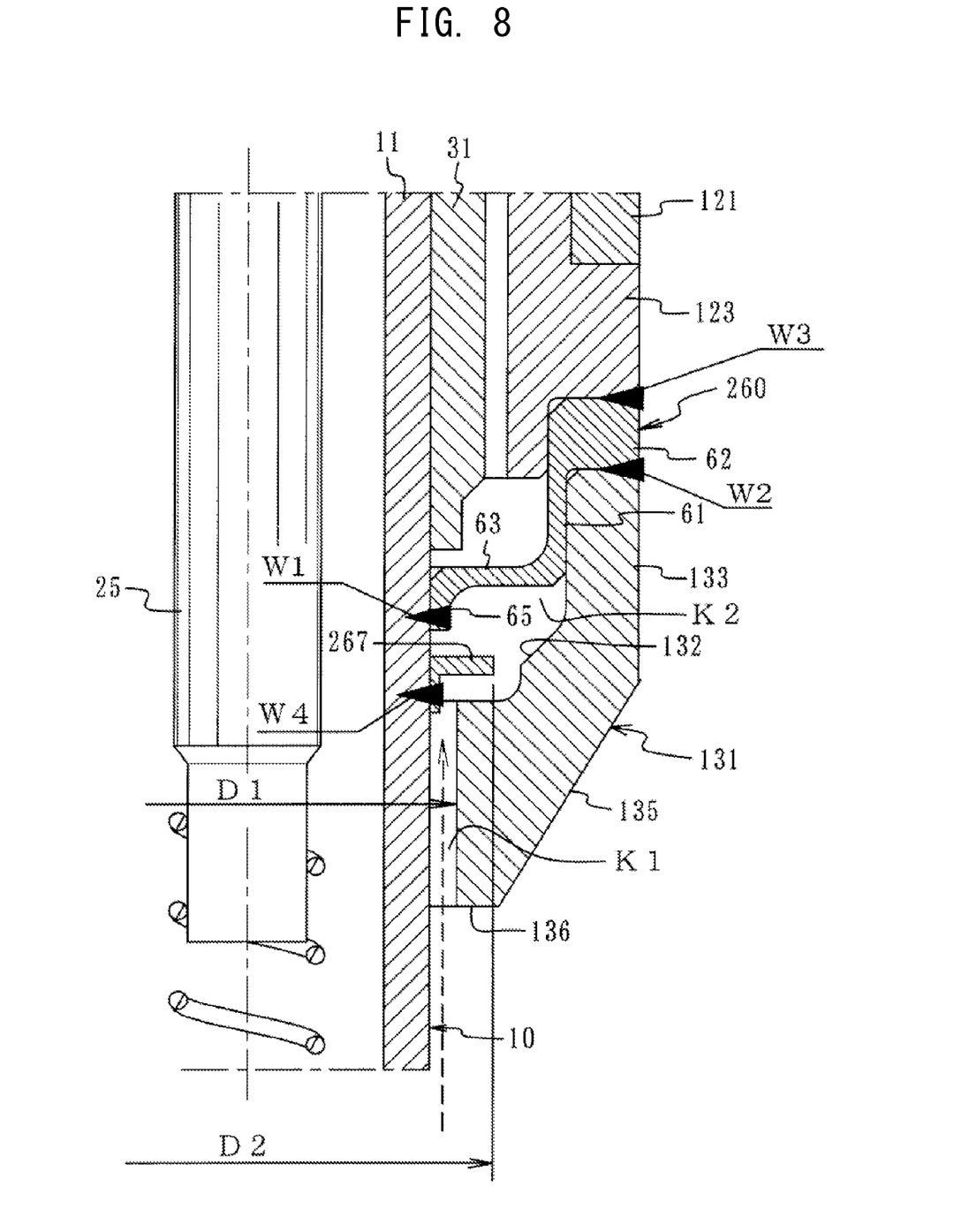
FIG. 8 Enlarged sectional view of another example (second embodiment) of the essential members including the seal member (holing member).

Next, a glow plug according to another embodiment (second embodiment) of the present invention is described with reference to FIG. 8. An essential difference does not exist between the glow plug of the present embodiment and the above-described glow plug of the first embodiment, and, as shown in FIG. 8 which is an enlarged view corresponding to that of FIG. 2, they differ only in the structures of a seal member 260 and a combustion gas prevention wall 267. Therefore, only points of difference will be described while like components are denoted by like reference numerals. In the present embodiment, unlike the seal member 60 of the first embodiment, the combustion gas prevention wall 267 is welded to the outer circumferential surface of the heater 10 in the circumferential direction at a predetermined position W4 such that the combustion gas prevention wall 267 is separated from the forward end of the small-diameter cylindrical portion 65; i.e., the combustion gas prevention wall 267 is provided in the diameter increased annular space K2 separately from the seal member 260. Accordingly, it is clear that the present embodiment employing the combustion gas prevention wall 267 achieves the same action and effect as those of the above-described embodiment. Namely, even in the case of the present embodiment, combustion gas of high temperature and high pressure—which rushes from the forward end 10a of the heater 10 toward the rear end thereof along the outer circumferential surface thereof during combustion cycles of an engine—enters the diameter increased annular space K2. However, such combustion gas first hits against the combustion gas prevention wall 67. Since the combustion gas does not directly hit against the annular membrane portion 63, anomalous thermal expansion of the seal member 267 can be reduced. In the present embodiment, the combustion gas prevention wall 267 having an L-shaped cross section is welded to the outer circumferential surface of the heater 10 via one flange thereof, and the other flange forms the combustion gas prevention wall 267.

In the above-described embodiments, the holding member is the seal member. Thus, the seal member is joined to the housing and to the heater continuously along the entire circumference. However, in the case where, in the present invention, the holding member is not required to provide a seal; i.e., the holding member plays only a role of holding the heater, the holding member may be joined continuously along the entire circumference as described above or may be joined discontinuously. For example, the holding member may be joined at circumferential intervals; for example, at three or four positions in a spotlike manner. Although the holding member is joined continuously along the circumferential direction, the holding member may not be joined continuously along the entire circumference. The holding member may be joined continuously along the circumferential direction within an angular range of, for example, three-fourths (270 degrees) of full circle (360 degrees).

In the present invention, no limitation is imposed on the shape and structure of the combustion gas prevention wall and they can be freely determined so long as the combustion gas prevention wall is provided such that it can prevent the high-temperature combustion gas which rushes in the axial direction of the heater along the surface of the heater from directly hitting against the annular membrane portion of the holding member. Also, no limitation is imposed on the number of the combustion gas prevention wall so long as the combustion gas prevention wall can prevent the direct hitting against of the combustion gas against the annular membrane portion of the holding member. Therefore, a plurality of combustion gas prevention walls may be provided at different locations in the axial direction. In the above-described embodiments, the sensor is the piezoelectric element; however, the sensor may be of any type, so long as the sensor can sense combustion pressure from pressure generated as a result of combustion gas pressing the heater rearward or from axial displacement of the heater caused by the pressure; therefore, for example, the present invention can be applied to the case where a strain sensor is used.

In the glow plugs of the above-described embodiments, the heater is composed of the sheath pipe, the sheath pipe sleeve, etc., and the housing is composed of the housing body, the forward-end housing, etc.; however, the present invention can be embodied such that the heater and the housing are configured as appropriate. Furthermore, in the above-described embodiments, the diameter increased annular space is formed inside the forward-end housing, and the outer peripheral edge of the holding member (seal member) is welded and fixed in a state in which the outer peripheral edge is sandwiched between the forward-end housing and the flange of the piezoelectric element-supporting inner housing. However, the welding structure of the holding member to the housing is not limited thereto. Further, in the above-described embodiments, welding is used as joining means for joining the holding member; in this case, welding may be of any appropriate type, such as laser welding, electron beam welding, or resistance welding. Moreover, for portions which do not require welding, joining means other than welding may be used as appropriate. For example, for such portions, only tight fitting such as press fitting may be performed, and brazing may be performed by use of a brazing metal.

DESCRIPTION OF REFERENCE NUMERALS

10: heater
10a: forward end of the heater
40: piezoelectric element (sensor)
60, 267: seal member (holding member)
63: annular membrane portion of the seal member (holding member)
65: small-diameter tubular portion (cylindrical portion (annular portion) extending forward from the inner peripheral edge of the annular membrane portion of the seal member (holding member))
67, 267: combustion gas prevention wall
101: glow plug having a combustion pressure sensor
110: housing
111: housing body
121: piezoelectric element-supporting inner housing
132: diameter increased annular inner circumferential surface
136: forward end of the housing
G: axis of the heater
K2: diameter increased annular space
K1: annular gap between the inner circumferential surface of the forward end of the housing and the outer circumferential surface of the heater
D1: inner diameter of the forward end of the housing
D2: outer diameter of the combustion gas prevention wall

The invention claimed is:

1. A glow plug having a combustion pressure sensor in which a rodlike heater is disposed in a tubular housing in an axially displaceable manner with a forward end of the heater projecting from a forward end of the housing and with a gap retained between an inner circumferential surface of the housing and an outer circumferential surface of the heater and which has a sensor capable of sensing combustion pressure through detection of pressure or displacement generated as a result of the combustion pressure pressing the heater rearward from the forward end of the heater,
  wherein a holding member formed in a deformable manner, having an annular membrane portion and externally fitted to the heater so as to hold the heater is joined to the housing and to the heater along a circumferential direction such that at least the annular membrane portion is located in a space between an inner circumferential surface of a near-forward-end portion of the housing and the outer circumferential surface of the heater so as to partition the space between the inner circumferential surface of the housing and the outer circumferential surface of the heater into axially forward and rearward parts,
  the glow plug being characterized in that when viewed rearward from a forward side of the heater along the axial direction, a combustion gas prevention wall which extends radially outward is provided forward of the annular membrane portion of the holding member and a joint portion between the holding member and the heater, wherein the combustion gas prevention wall is provided at the outer circumferential surface of the heater and spaced apart from the housing, wherein the combustion gas prevention wall is provided between the inner circumferential surface of the housing and the outer circumferential surface of the heater.

2. The glow plug having a combustion pressure sensor according to claim 1, wherein the combustion gas prevention wall is provided on a tubular portion or annular portion which extends forward from an inner peripheral edge of the annular membrane portion of the holding member.

3. The glow plug having a combustion pressure sensor according to claim 1, wherein the near-forward-end portion of the housing has a diameter increased annular inner circumferential surface having a diameter greater than an inner diameter of the forward end of the housing, the holding member is disposed such that at least its annular membrane portion is located in a space between the diameter increased annular inner circumferential surface and the outer circumferential surface of the heater, and the combustion gas prevention wall has an outer diameter greater than the inner diameter of the forward end of the housing.

4. The glow plug having a combustion pressure sensor according to claim 1, wherein the combustion gas prevention wall is provided forward of the holding member separately from the holding member.

5. The glow plug having a combustion pressure sensor according to claim 1, wherein the combustion gas prevention wall is curled rearward at its distal end.

* * * * *